(12) United States Patent
Stratton

(10) Patent No.: US 12,228,839 B2
(45) Date of Patent: Feb. 18, 2025

(54) STACKED GRADIENT-INDEX LIQUID CRYSTAL LENS ASSEMBLY

(71) Applicant: Meta Platforms Technologies, LLC, Menlo Park, CA (US)

(72) Inventor: Eric Stratton, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/171,964

(22) Filed: Feb. 21, 2023

(65) Prior Publication Data

US 2024/0111201 A1  Apr. 4, 2024

Related U.S. Application Data

(60) Provisional application No. 63/377,575, filed on Sep. 29, 2022.

(51) Int. Cl.
*G02F 1/29* (2006.01)
*G02B 27/01* (2006.01)

(52) U.S. Cl.
CPC ......... *G02F 1/294* (2021.01); *G02B 27/0172* (2013.01); *G02B 2027/0178* (2013.01)

(58) Field of Classification Search
CPC .............. G02F 1/294; G02B 27/0172; G02B 2027/0178
See application file for complete search history.

(56) References Cited

U.S. PATENT DOCUMENTS

| | | | |
|---|---|---|---|
| 7,327,434 B1* | 2/2008 | Ren | G02B 3/14 349/200 |
| 2001/0055145 A1* | 12/2001 | Hamada | G02B 3/14 359/290 |
| 2011/0234934 A1* | 9/2011 | Chang | G02F 1/13471 349/74 |
| 2012/0257131 A1* | 10/2012 | Galstian | G02F 1/13439 349/36 |
| 2017/0075163 A1* | 3/2017 | Galstian | G02F 1/13394 |
| 2021/0003901 A1 | 1/2021 | Yaroshchuk et al. | |
| 2021/0389591 A1 | 12/2021 | Lee et al. | |
| 2022/0252931 A1 | 8/2022 | Jamali et al. | |

FOREIGN PATENT DOCUMENTS

| | | |
|---|---|---|
| JP | 2009128555 A | 6/2009 |
| JP | 7064256 B1 | 5/2022 |

OTHER PUBLICATIONS

European Search Report for European Patent Application No. 23194036.2, dated Jan. 29, 2024, 6 pages.

* cited by examiner

*Primary Examiner* — Kwang-Su Yang
(74) *Attorney, Agent, or Firm* — Greenberg Traurig, LLP

(57) ABSTRACT

The disclosed device may include a lens stack. The lens stack may include a first gradient-index liquid crystal lens and a second gradient-index liquid crystal lens in tandem with the first gradient-index liquid crystal lens. The lens stack may be configured to reach a target optical power based on a first optical power of the first gradient-index liquid crystal lens and a second optical power of the second gradient-index liquid crystal lens. Various other devices, systems, and methods are also disclosed.

20 Claims, 10 Drawing Sheets

400

STACKED GRADIENT-INDEX LIQUID CRYSTAL LENS ASSEMBLY

CROSS REFERENCE TO RELATED APPLICATION

This application claims the benefit of U.S. Provisional Application No. 63/377,575, filed 29 Sep. 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
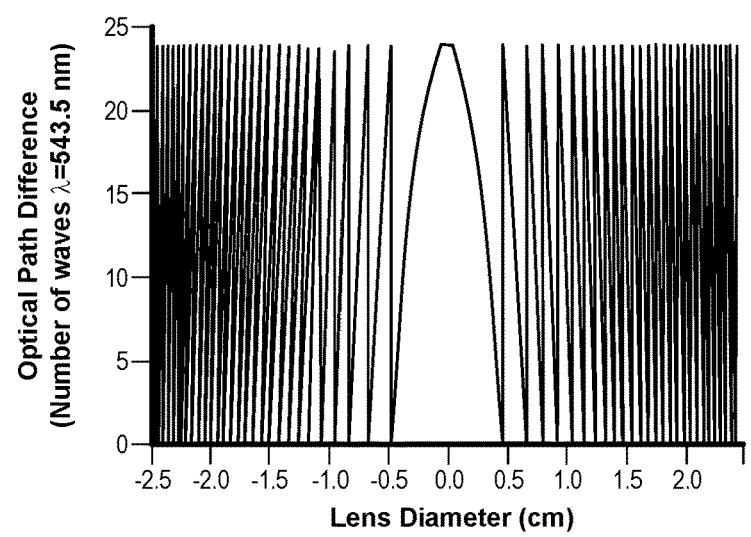
FIG. 1 shows the profile of the optical path difference in an example GRIN LC lens architecture according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Across various optical engineering applications including eyeglasses, contact lenses, and optical elements in augmented reality (AR) and virtual reality (VR) systems, liquid crystal (LC) lenses may provide a number of advantages due to their electrically tunable focusing capability, where the associated optical mechanism is based on a spatially localized modulation of light speed resulting from LC molecular orientations driven by applied electric fields.

In such context the realization of a continuous distribution of phase retardation across larger aperture (>10 mm) LC lenses may be challenged by the limited birefringence (<0.5) of LC materials as well as their mechanically compliant nature. In some embodiments, a gradient-index configuration may be used to provide tunability of focus quality.

Gradient-index (GRIN) optics refers to a branch of optics where optical effects are produced by a spatial gradient in the refractive index of a material. A gradual refractive index variation may be used to manufacture lenses having planar surfaces, for example, or to reduce aberrations in imaging applications. In an LC lens having an axial gradient configuration, the refractive index may vary along the optical axis of an inhomogeneous medium such that surfaces of constant index are planes that are oriented perpendicular to the optical axis. In a radial/cylindrical refractive index gradient configuration, on the other hand, the index profile may vary continuously from a centerline of the optical axis to the periphery along the transverse direction in such a way that surfaces of constant index are concentric cylinders located about the optical axis. Hybrid GRIN LC lenses having both an axial and a radial/cylindrical refractive index gradient configuration are also contemplated.

GRIN-type LC lenses may be configured to exhibit a gradient distribution of refractive index in response to a spatially inhomogeneous electric field that is applied across the LC layer(s). As such, the lens power of a GRIN-type LC lens may also be continuously tunable. In some instantiations, there may be a continuous variation of the refractive index within the lens material. An LC lens may be configured in both planar and non-planar (e.g., concave or convex) geometries.

In some examples, a tunable architecture may include a voltage-tunable layer formed over the LC layer(s) within the optical aperture of the lens. During operation, different voltages may be applied to different areas of the voltage-tunable layer, which may be used to locally tune the refractive index of the LC material. The voltage-tunable layer may have any suitable design. For example, the voltage-tunable layer may include a plurality of discrete, ring electrodes formed over the LC layer(s) within the optical aperture of the lens. During operation, a different voltage may be applied to each electrode, which may be used to locally tune the refractive index of the LC material.

In some examples, the lens may have a Fresnel structure, where phase reset boundaries may correspond to abrupt changes in voltage. The abrupt change in voltage may produce a fringing field, which may cause liquid crystals near the phase reset boundaries to twist (e.g., away from standard orientations and/or to orientations that produce undesired optical effects). In some examples, the twisting of the crystals at the phase reset boundaries may induce performance liabilities, including the generation of optical artifacts such as scatter.

As used herein, the terms "scatter" and "clarity" may refer to an optical phenomenon associated with the transmission of light through a medium. As will be appreciated, scatter may be associated with an amount of light that is subject to wide angle scattering (e.g., at an angle greater than 2.5° from normal) and a corresponding loss of transmissive contrast, whereas clarity may relate to an amount of light that is subject to narrow angle scattering (e.g., at an angle less than 2.5° from normal) and an attendant loss of optical sharpness.

In some examples, in order to reduce scatter, a lens may include a mask that blocks light at and around phase reset boundaries (e.g., to block areas through which scattered light would otherwise pass). However, this may be at the cost of reducing the transmissivity of the lens.

The optical power of GRIN-type LC lenses can be increased with greater thickness, but at the expense of slower response time, reduced viewing angle, and a greater number of reset zones. By using two GRIN-type LC lenses in tandem, the same optical power can be achieved without the drawbacks of a thicker GRIN-type LC lens. However, using two GRIN-type LC lenses may result in an angular separation of masked zones in the respective GRIN-type LC lenses. This parallax may disproportionately negatively impact transmissivity through certain areas of the lens stack. However, as will be described in greater detail herein, the masked zones can be made in-line with each other from certain viewing angles by using two GRIN-type LC lenses with different mask placements. This may be accomplished, in some examples, by dividing the optical power unevenly between the two GRIN-type LC lenses (as this may result in different spacing between the masked zones of the lenses). Furthermore, the parallax may further be reduced by bringing the liquid crystal components of the GRIN-type LC lenses closer together. In some examples, a GRIN-type LC lens stack may have two GRIN-type LC lenses share a substrate (with the added benefit of making the assembly thinner) and/or by inverting one of the GRIN LC lenses so that the liquid crystal sides of the GRIN LC lenses are adjacent to each other.

In some examples, the two GRIN LC lenses may each have varifocal capabilities. The varifocal capabilities may involve changing the Fresnel reset patterns of the GRIN LC lenses and, therefore, may involve dynamically changing the mask patterns of the GRIN LC lenses. Thus, when adjusting the optical power of the lens stack as a whole, a variety of combinations of optical power of the two GRIN LC lenses may function to achieve the target optical power. Accordingly, in some examples, systems described herein may select a combination of optical powers for the two GRIN LC lenses that both (1) achieves the target cumulative optical power and (2) achieves a combination of mask patterns that, when accounting for parallax between the lenses from a preferred viewing angle, reduces the obstruction of the masks for the preferred viewing angle. These systems may determine the preferred viewing angle in any of a variety of ways. For example, these systems may determine the preferred viewing angle based on the current viewing angle of a user (e.g., as determined by an eye tracking device). Additionally or alternatively, these systems may determine the preferred viewing angle based on metadata describing one or more regions of interest in an image that is projected through the lenses.

FIG. 1 shows a profile 100 of the optical path difference in an example GRIN LC lens architecture according to some embodiments. The GRIN LC lens architecture may include a Fresnel structure. Accordingly, as shown in FIG. 1, profile 100 may include several Fresnel resets. The density of the Fresnel resets may increase toward the periphery of the lens.

Figure 2:
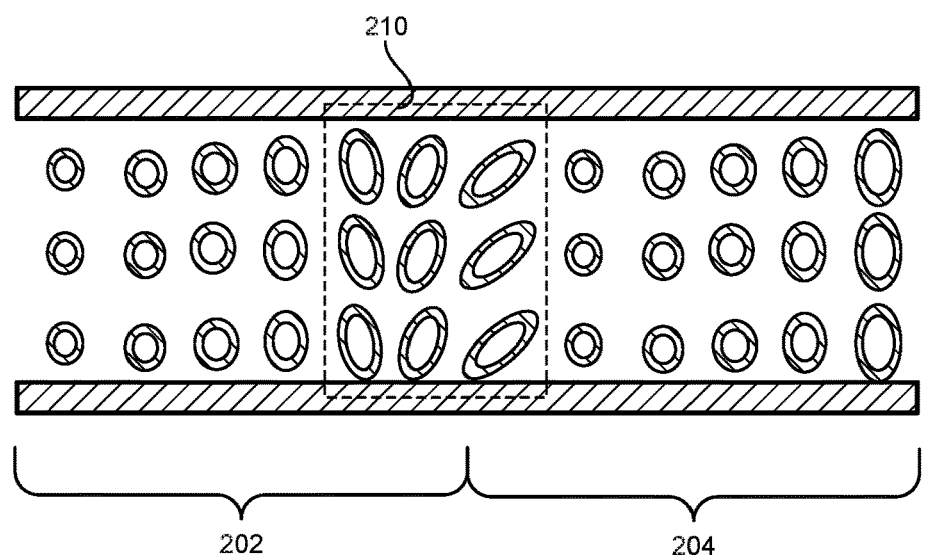
FIG. 2 illustrates an example liquid crystal region in a GRIN LC lens design according to some embodiments.

FIG. 2 illustrates an example liquid crystal region 200 in a GRIN LC lens design according to some embodiments. As shown in FIG. 2, the liquid crystals in a phase region 202, starting at the far-left column, may be arranged (e.g., via applied voltage) to be longitudinally aligned along the z axis. In each subsequent column of phase region 202, the liquid crystals may be further rotated in the y-z plane, until they are longitudinally aligned along the y axis. With a phase reset after phase region 202, a similar pattern may repeat in a phase region 204. However, as may be appreciated, in a phase reset boundary area 210, the liquid crystals may deviate from the pattern. For example, instead of one column being perfectly longitudinally aligned along the y axis before the reset, and then the next column being perfectly longitudinally aligned along the z axis after the reset, liquid crystals in phase reset boundary area 210 may twist (e.g., including rotation in the x-y plane).

In some examples, the twisting of the liquid crystals in phase reset boundary area 210 may be due at least in part to a fringing field produced by an abrupt change in voltage at the phase reset boundary between phase regions 202 and 204.

Figure 3:
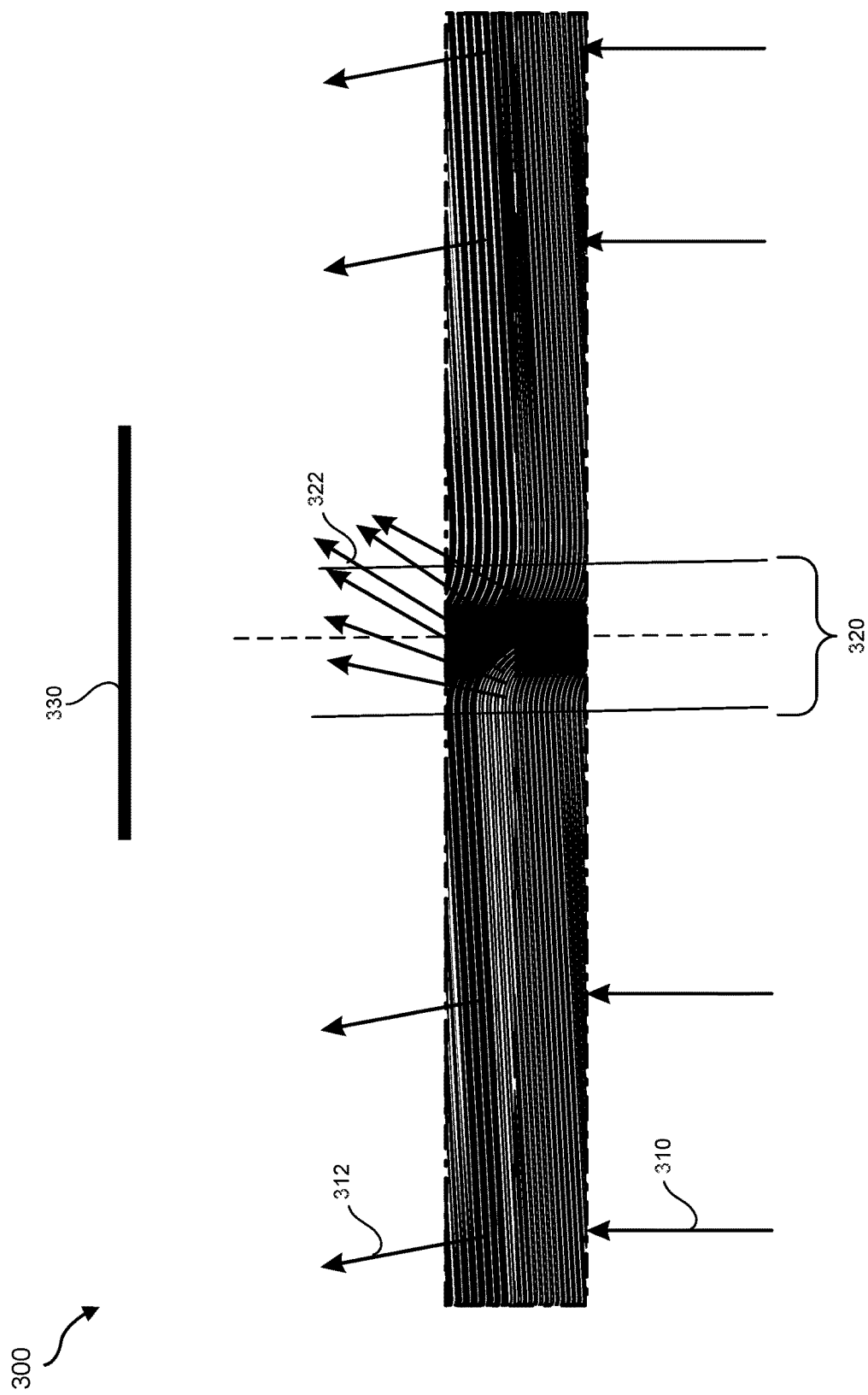
FIG. 3 illustrates an example scattering region in a GRIN LC lens design according to some embodiments.

FIG. 3 illustrates an example GRIN LC lens 300. As shown in FIG. 3, one or more light rays 310 (e.g., being part of a plane wave) may enter lens 300. Due to the optical properties of lens 300, one or more deflected light rays 312 may emerge from the other side of lens 300. However, within a phase reset transition area 320, a fringing field may cause exiting light rays 322 to scatter. Light rays 322 may contribute to scatter and/or reduced clarity. In some examples, a mask 330 may be positioned to block at least some of scattered light rays 322. However, mask 330 may reduce the transmissivity of lens 300 (e.g., by blocking some of deflected light rays 312).

Figure 4:
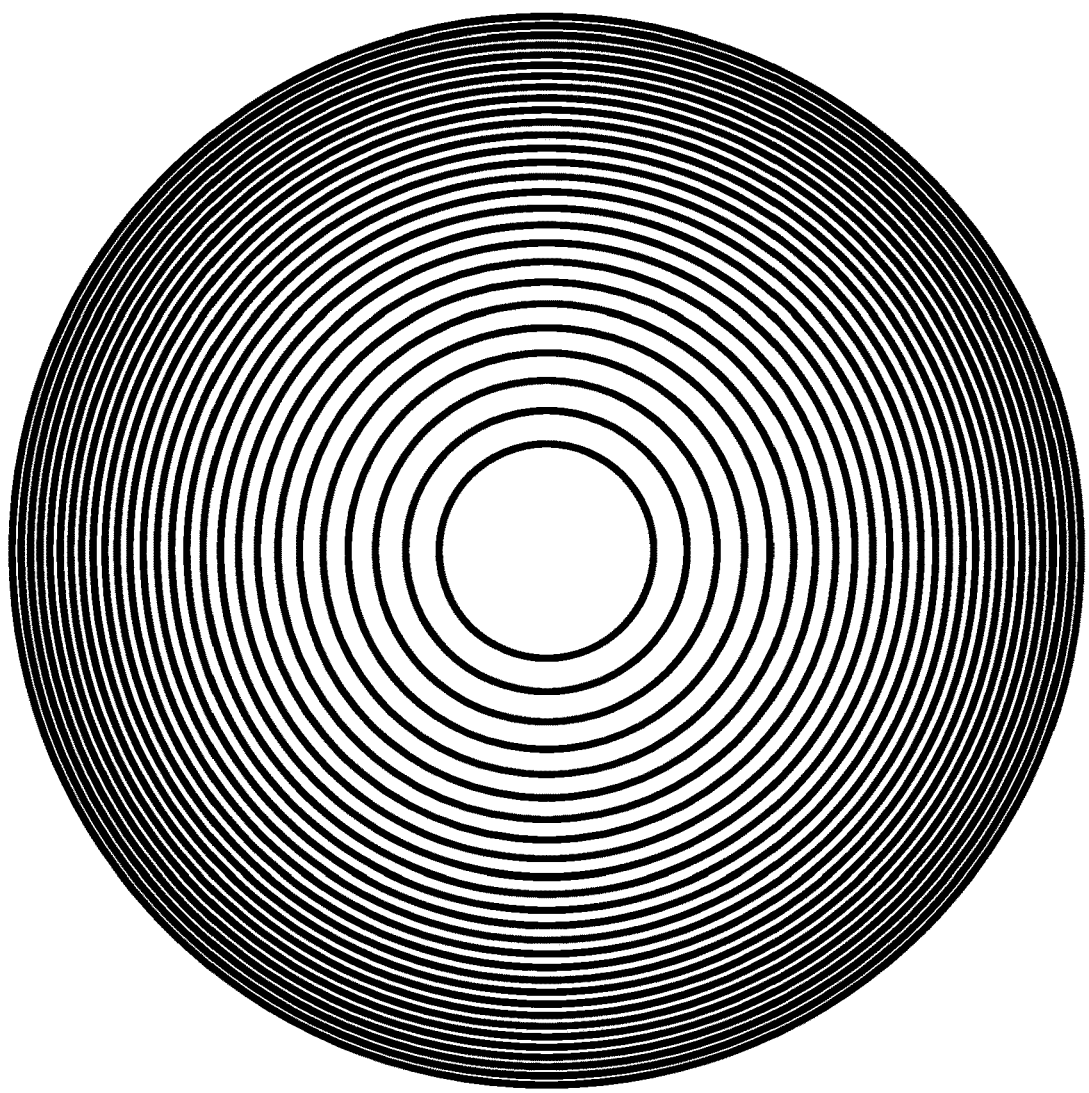
FIG. 4 illustrates an example mask pattern for an example GRIN LC lens design according to certain embodiments.

FIG. 4 illustrates an example mask pattern 400 for an example GRIN LC lens design. As shown in FIG. 4, mask pattern 400 may occlude some light and, thus, reduce transmissivity of the GRIN LC lens.

Figure 5:
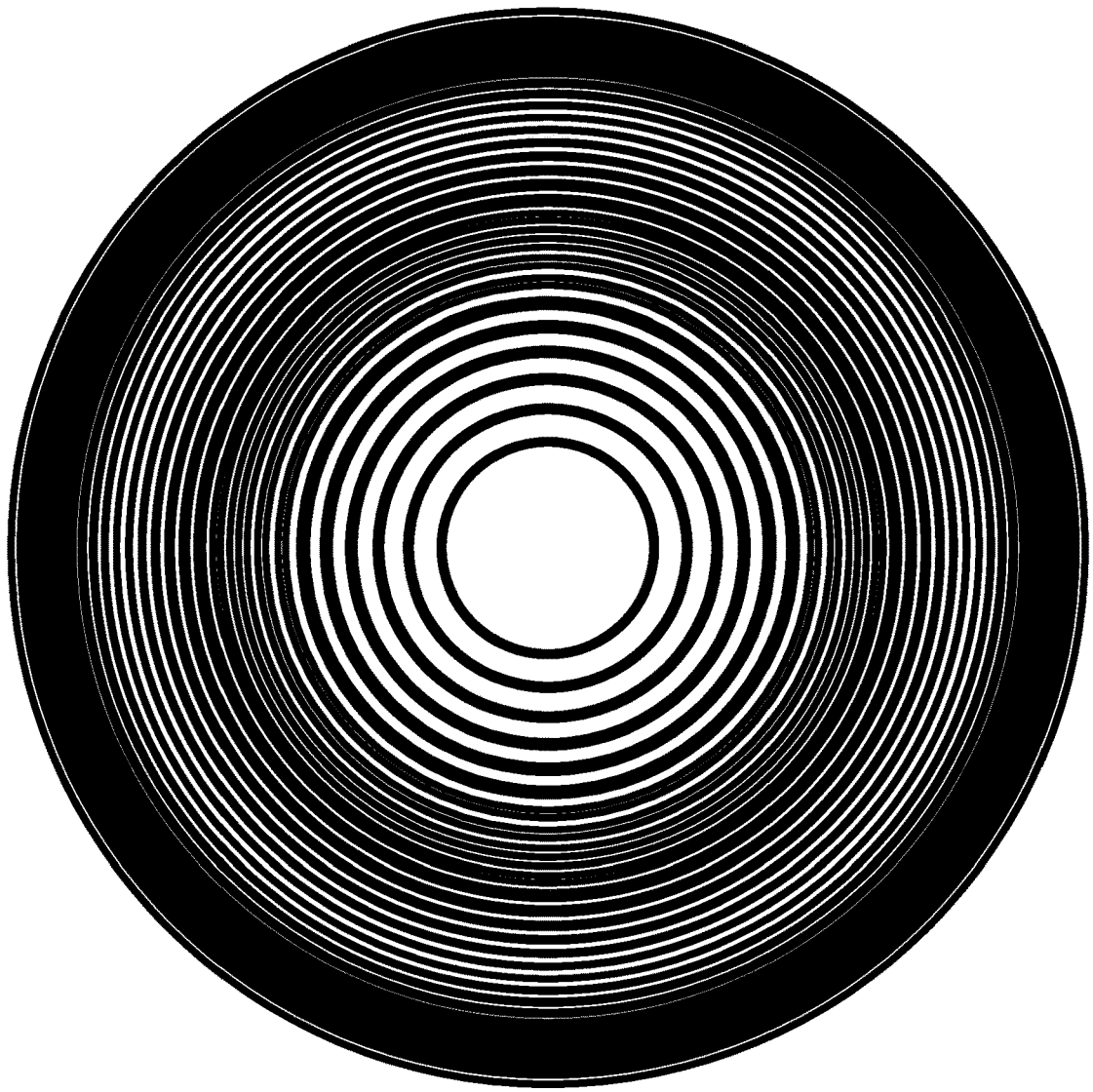
FIG. 5 illustrates an example mask pattern for example stacked GRIN LC lenses according to certain embodiments.

FIG. 5 illustrates an example mask pattern 500 for example stacked GRIN LC lenses according to certain embodiments. In one example, the stacked GRIN LC lenses may have the same optical power and, therefore, the same mask pattern. However, because one lens is behind the other at a distance, the mask patterns may demonstrate parallax from a viewing position. The parallax may cause the masks of one GRIN LC lens to occlude light in maskless areas of the other GRIN LC lens, reducing overall transmissivity to a greater degree than the mask pattern 400 of the single lens shown in FIG. 4, and reducing local transmissivity of certain regions (including, e.g., the periphery) disproportionately.

Figure 6:
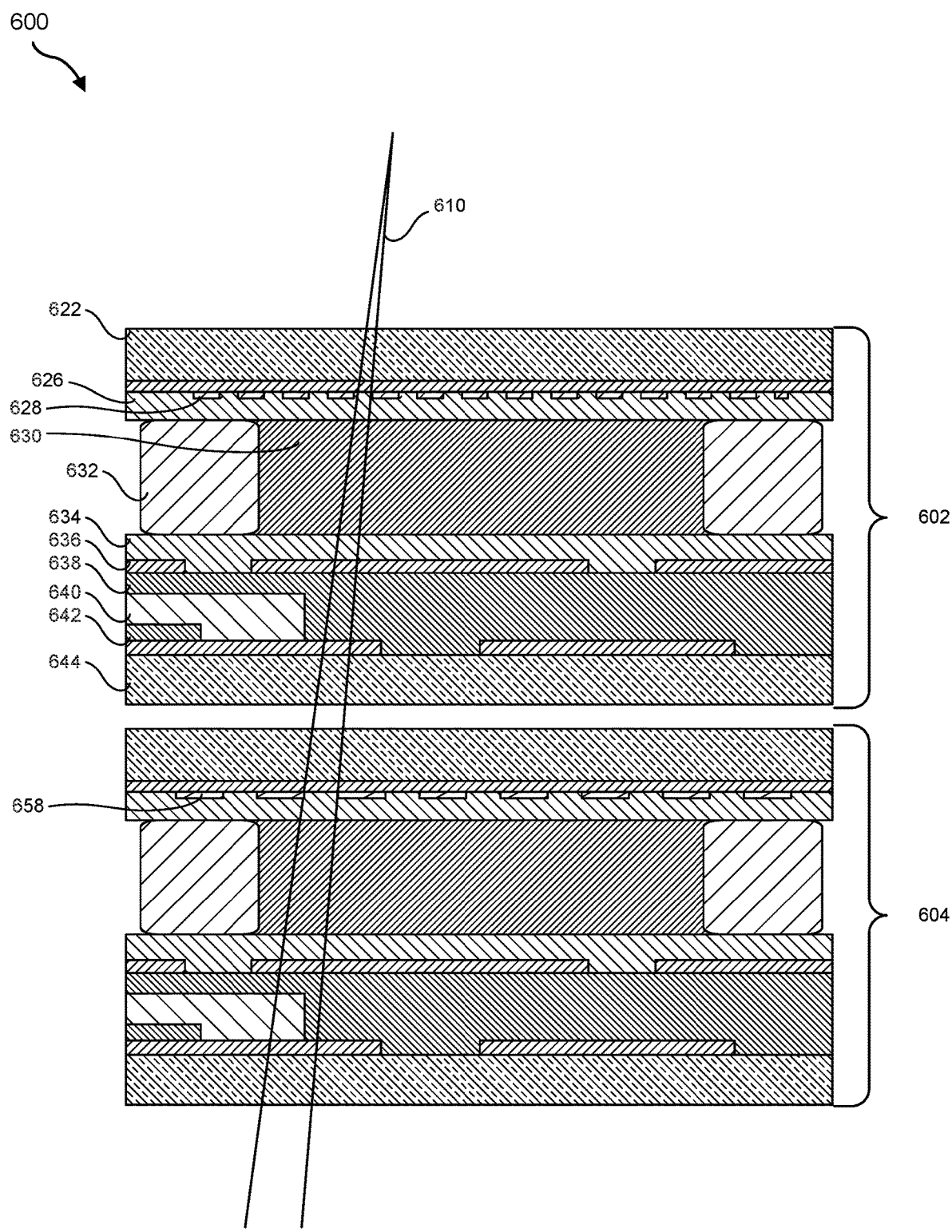
FIG. 6 illustrates an example GRIN LC lens stack according to certain embodiments.

FIG. 6 illustrates an example GRIN LC lens stack 600 according to certain embodiments. As shown in FIG. 6, GRIN LC lens stack 600 may include two GRIN LC lenses in tandem (e.g., a GRIN LC lens 602 and a GRIN LC lens 604). The two GRIN LC lenses 602 and 604 in tandem may provide cumulative optical power. In addition, because each GRIN LC lens is thinner than a single GRIN LC lens of equivalent optical power, stack 600 may have a faster response time and a wider viewing angle than a single LC lens of equivalent optical power would have.

Furthermore, the two GRIN LC lenses 602 and 604 of stack 600 may have different optical powers from each other, each lens contributing a different proportion to the cumulative optical power of stack 600. The different optical powers of the two GRIN LC lenses may correspond to different Fresnel reset patterns, and, therefore, to different mask patterns. The different mask patterns may result in greater alignments of the mask patterns (given parallax) from certain viewing angles. Thus, for example, a cone of vision 610 may be unobstructed by the masks of both lenses given the specific mask patterns of each lens.

In some examples, the two GRIN LC lenses 602 and 604 may be selected such that they, in tandem, produce a target optical power. Additionally or alternatively, the two GRIN LC lenses 602 and 604 may be varifocal lenses and may be dynamically configured and/or adjusted such that they, in tandem, produce a target optical power.

As shown in FIG. 6, in one example GRIN LC lens 602 may include a substrate 622, a substrate 626, a set of masks 628, a liquid crystal layer 630, gaskets 632, a substrate 634, a conductive layer 636, a substrate 638, a conductor 640, a conductive layer 642, and a substrate 644.

Substrate 622 may include any suitable optically transparent substrate. For example, substrate 622 may include glass, silica, and/or an optically transparent polymer. Substrate 626 may include any suitable optically transparent substrate. For example, substrate 626 may include glass and/or an optically transparent polymer. In one example, substrate 626 may include polyimide (e.g., optically transparent polyimide). Masks 628 may include any suitable dye and/or optically absorbent material. In some examples, the pattern of masks 628 may be changeable (e.g., via an electric signal). Accordingly, in these examples, substrate 626 and masks 628 together may form any suitable layer that is optically transparent except for a changeable pattern of opaque elements.

Conductive layer 636 may include any suitable conductive material. For example, conductive layer 636 may include an optically transparent conductive material. In some examples, conductive layer 636 may include indium tin oxide. Substrate 638 may include any suitable material. For example, substrate 638 may include silica. Conductor 640 may include any suitable material. For example, conductor 640 may include nickel. Substrate 644 may include any suitable material. For example, substrate 644 may include glass, silica, and/or an optically transparent polymer.

In some examples, GRIN LC lens 604 may be of a substantially similar design to GRIN LC lens 602. Nevertheless, in some examples, a set of masks 658 in lens 604 may have a different mask pattern than masks 628 in lens 602. For example, masks 658 may be spaced more widely than masks 628, such that one or more cones of vision (such as cone of vision 610) may be partly or completely unobstructed by the masks of both lenses 602 and 604.

Figure 7:
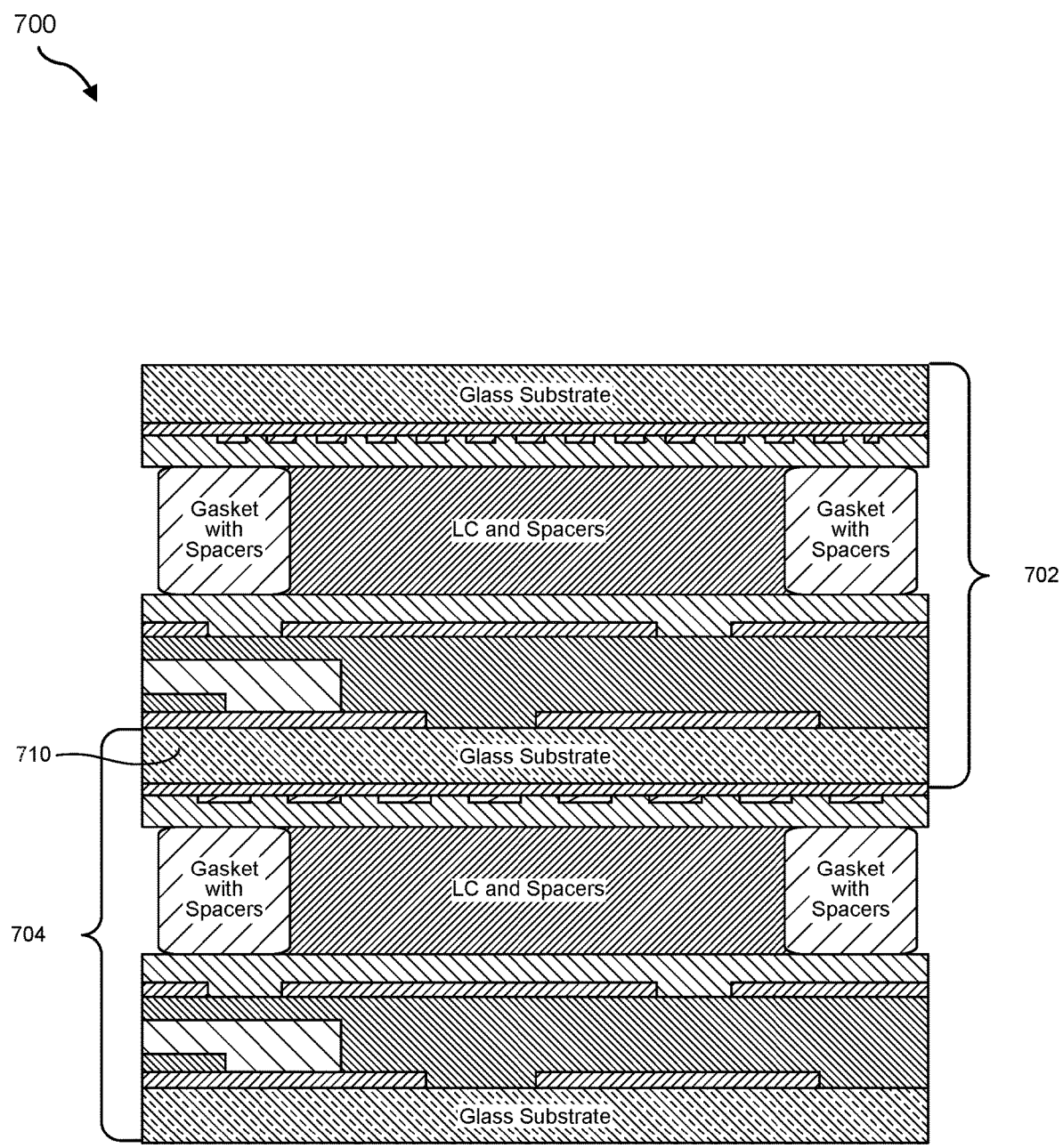
FIG. 7 illustrates an example GRIN LC lens stack according to certain embodiments.

FIG. 7 illustrates an example GRIN LC lens stack 700 according to certain embodiments. As shown in FIG. 7, stack 700 may include a GRIN LC lens 702 and a GRIN LC lens 704 in tandem. GRIN LC lenses 702 and 704 may share a substrate 710 (e.g., a glass substrate). This may result in stack 700 being thinner than otherwise (e.g., than stack 600 in FIG. 6). In addition, the mask layers of GRIN LC lens 702 and GRIN LC lens 704 may be closer together, potentially reducing the overall parallax effect between the mask patterns of the two GRIN LC lenses.

Figure 8:
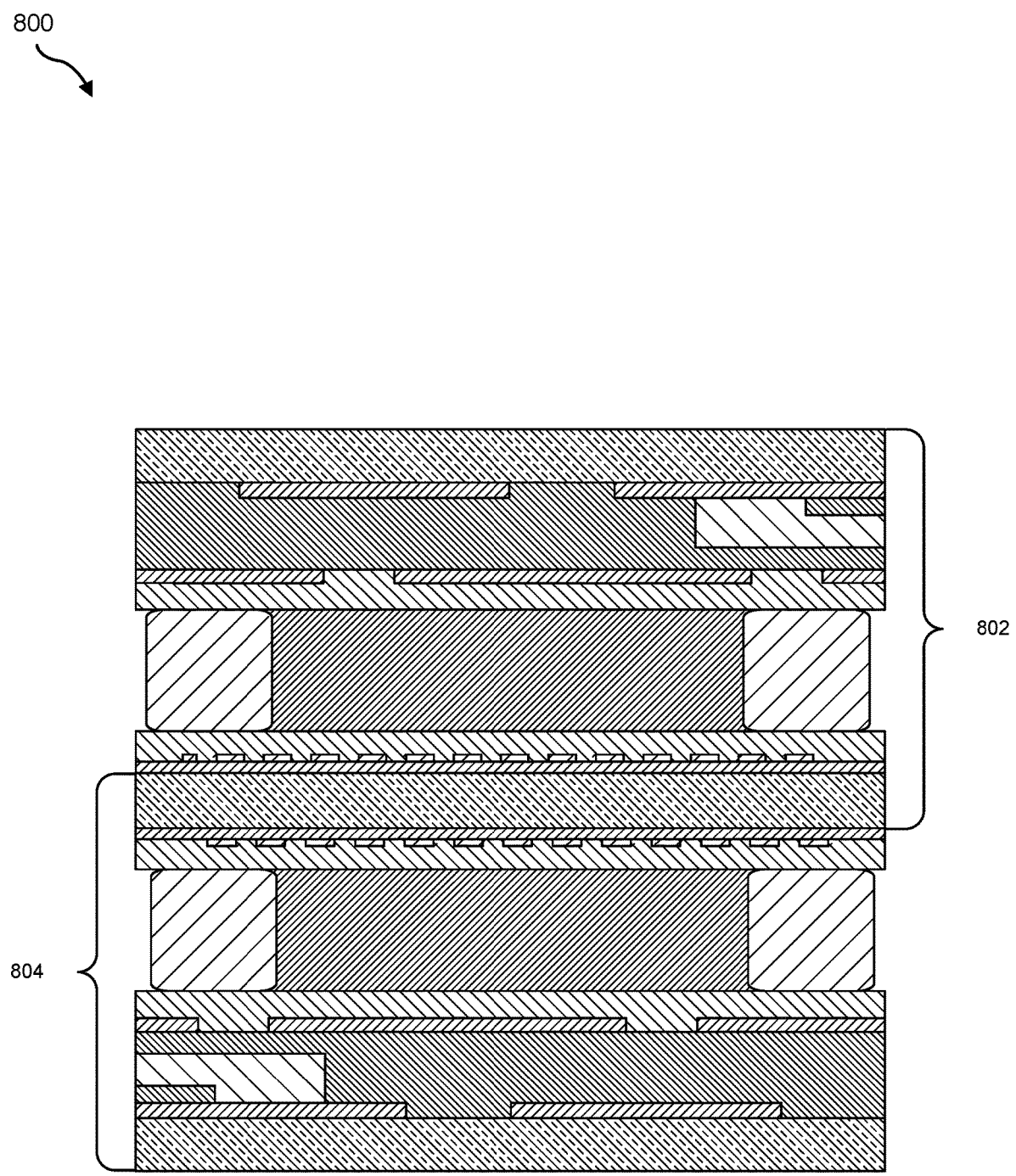
FIG. 8 illustrates an example GRIN LC lens stack according to certain embodiments.

FIG. 8 illustrates an example GRIN LC lens stack 800 according to certain embodiments. As shown in FIG. 8, stack 800 may include a GRIN LC lens 802 and a GRIN LC lens 804 in tandem. GRIN LC lenses 802 and 804 of stack 800 may share a substrate. In addition, one of the GRIN LC lenses may be inverted relative to the other GRIN LC lens (e.g., lens 802 may be inverted relative to lens 804), such that the mask layers of GRIN LC lenses 802 and 804 may be closer together, thereby reducing the overall parallax effect between the mask patterns of the two GRIN LC lenses.

As will be explained in greater detail below, in some examples one or more of the lens stacks described herein may be incorporated into a head-mounted display (e.g., a VR system and/or an AR system).

EXAMPLE EMBODIMENTS

Example 1: A device may include a lens stack. The lens stack may include a first gradient-index liquid crystal lens and a second gradient-index liquid crystal lens in tandem with the first gradient-index liquid crystal lens. The lens stack may be configured to reach a target optical power based on a first optical power of the first gradient-index liquid crystal lens and a second optical power of the second gradient-index liquid crystal lens.

Example 2: The device of Example 1, where the first and second GRIN LC lenses are varifocal lenses.

Example 3: The device of any of Examples 1 and 2, where the first GRIN LC lens includes a first layer of masks at one or more Fresnel resets of the first gradient-index liquid crystal lens and the second gradient-index liquid crystal lens includes a second layer of masks at one or more Fresnel resets of the second gradient-index liquid crystal lens.

Example 4: The device of any of Examples 1-3, where the first optical power differs from the second optical power.

Example 5: The device of any of Examples 1-4, where when the first optical power of the first GRIN LC lens changes, the second optical power of the second GRIN LC lens changes such that the first GRIN LC lens and the second GRIN LC lens maintain differing optical powers.

Example 6: The device of any of Examples 1-5, where the first GRIN LC lens includes a first layer of masks and the second GRIN LC lens includes a second layer of masks.

Example 7: The device of any of Examples 1-6, where the first layer of masks occludes light scattered by the first GRIN LC lens and the second layer of masks occludes light scattered by the second GRIN LC lens.

Example 8, The device of any of Examples 1-7, where the first layer of masks is aligned with one or more Fresnel resets of the first GRIN LC lens and the second layer of masks is aligned with one or more Fresnel resets of the second GRIN LC lens.

Example 9: The device of any of Examples 1-8, where the first GRIN LC lens and the second GRIN LC lens are disposed such that the first layer of masks and the second layer of masks are positioned in between a first liquid crystal layer of the first GRIN LC lens and a second liquid crystal layer of the second GRIN LC lens.

Example 10: The device of any of Examples 1-9, where the first GRIN LC lens and the second GRIN LC lens share a substrate.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG.

Figure 10:
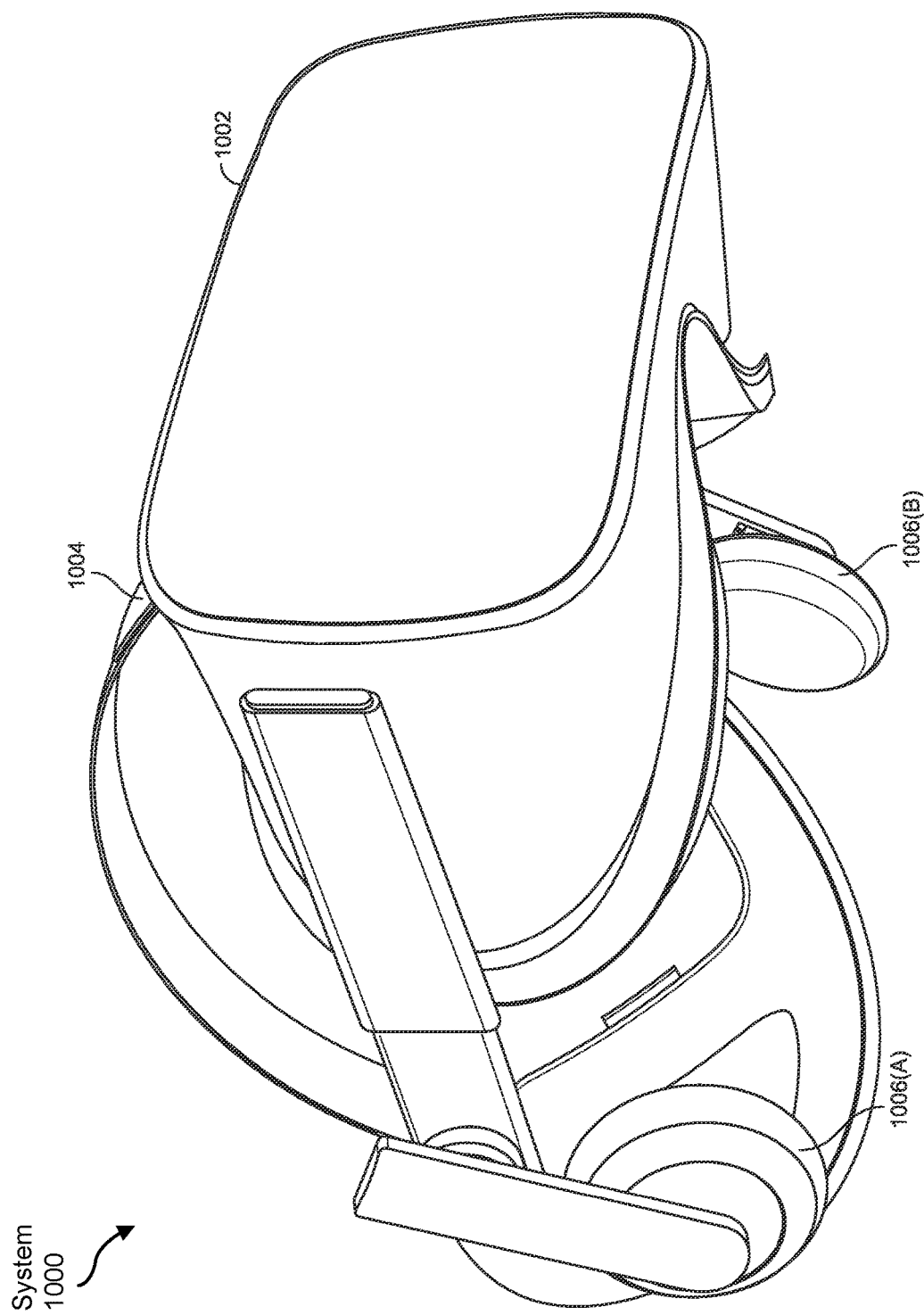
FIG. 10 is an illustration of an exemplary virtual-reality headset that may be used in connection with embodiments of this disclosure.

9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
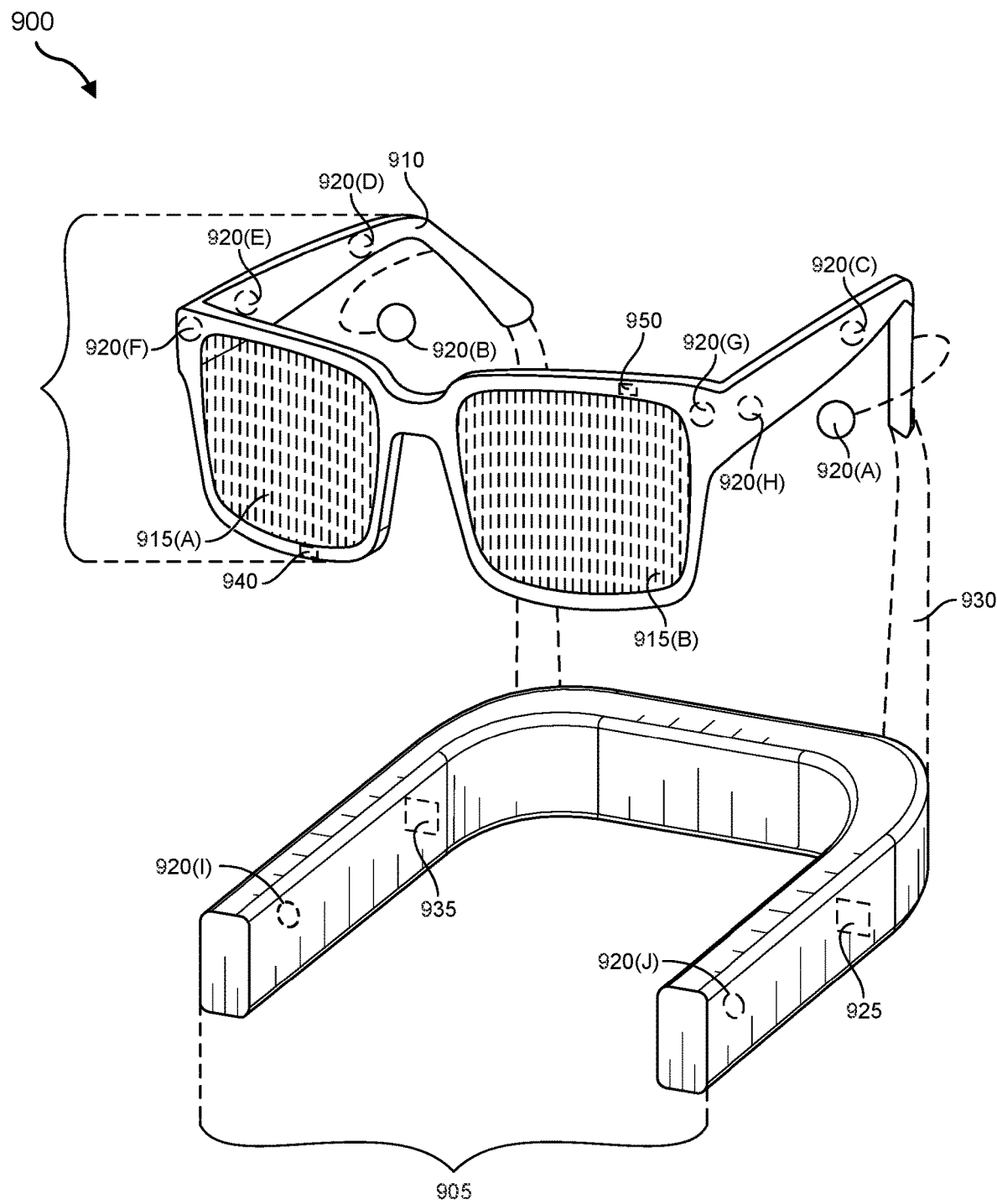
FIG. 9 is an illustration of exemplary augmented-reality glasses that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a lens stack comprising:
      a first gradient-index liquid crystal lens comprising a first layer of masks; and
      a second gradient-index liquid crystal lens in tandem with the first gradient-index liquid crystal lens, and comprising a second layer of masks,
   wherein the lens stack is configured to reach a target optical power based on a first optical power of the first gradient-index liquid crystal lens and a second optical power of the second gradient-index liquid crystal lens, and
   wherein a difference of mask patterns between the first layer of masks and the second layer of masks is based on the first optical power of the first gradient-index liquid crystal lens and the second optical power of the second gradient-index liquid crystal lens.

2. The device of claim 1, wherein the first and second gradient-index liquid crystal lenses are varifocal lenses.

3. The device of claim 1, wherein the first optical power differs from the second optical power.

4. The device of claim 3, wherein when the first optical power of the first gradient-index liquid crystal lens changes, the second optical power of the second gradient-index liquid crystal lens changes such that the first gradient-index liquid crystal lens and the second gradient-index liquid crystal lens maintain differing optical powers.

5. The device of claim 1, wherein:
the first layer of masks occludes light scattered by the first gradient-index liquid crystal lens; and
the second layer of masks occludes light scattered by the second gradient-index liquid crystal lens.

6. The device of claim 1, wherein:
the first layer of masks is aligned with one or more Fresnel resets of the first gradient-index liquid crystal lens; and
the second layer of masks is aligned with one or more Fresnel resets of the second gradient-index liquid crystal lens.

7. The device of claim 1, wherein the first gradient-index liquid crystal lens and the second gradient-index liquid crystal lens are disposed such that the first layer of masks and the second layer of masks are positioned in between a first liquid crystal layer of the first gradient-index liquid crystal lens and a second liquid crystal layer of the second gradient-index liquid crystal lens.

8. The device of claim 1, wherein the first gradient-index liquid crystal lens and the second gradient-index liquid crystal lens share a substrate.

9. The device of claim 1, wherein the difference of mask patterns is based on a parallax between the first gradient-index liquid crystal lens and the second gradient-index liquid crystal lens with respect to a preferred viewing angle.

10. The device of claim 9, wherein the difference of mask patterns includes a difference in spacing such that a cone of vision corresponding to the preferred viewing angle is completely unobstructed by the first layer of masks and the second layer of masks.

11. A system comprising:
a head-mounted display comprising:
a lens stack comprising:
a first gradient-index liquid crystal lens comprising a first layer of masks; and
a second gradient-index liquid crystal lens in tandem with the first gradient-index liquid crystal lens, and comprising a second layer of masks,
wherein the lens stack is configured to reach a target optical power based on a first optical power of the first gradient-index liquid crystal lens and a second optical power of the second gradient-index liquid crystal lens, and
wherein a difference of mask patterns between the first layer of masks and the second layer of masks is based on the first optical power of the first gradient-index liquid crystal lens and the second optical power of the second gradient-index liquid crystal lens.

12. The system of claim 11, wherein the first and second gradient-index liquid crystal lenses are varifocal lenses.

13. The system of claim 11, wherein:
the first layer of masks is aligned with one or more Fresnel resets of the first gradient-index liquid crystal lens; and
the second layer of masks is aligned with one or more Fresnel resets of the second gradient-index liquid crystal lens.

14. The system of claim 11, wherein the first optical power differs from the second optical power.

15. The system of claim 14, wherein when the first optical power of the first gradient-index liquid crystal lens changes, the second optical power of the second gradient-index liquid crystal lens changes such that the first gradient-index liquid crystal lens and the second gradient-index liquid crystal lens maintain differing optical powers.

16. The system of claim 11, wherein:
the first layer of masks occludes light scattered by the first gradient-index liquid crystal lens; and
the second layer of masks occludes light scattered by the second gradient-index liquid crystal lens.

17. The system of claim 11, wherein the first gradient-index liquid crystal lens and the second gradient-index liquid crystal lens are disposed such that the first layer of masks and the second layer of masks are positioned in between a first liquid crystal layer of the first gradient-index liquid crystal lens and a second liquid crystal layer of the second gradient-index liquid crystal lens.

18. The system of claim 11, wherein the difference of mask patterns is based on a parallax between the first gradient-index liquid crystal lens and the second gradient-index liquid crystal lens with respect to a preferred viewing angle.

19. The system of claim 18, wherein the difference of mask patterns includes a difference in spacing such that a cone of vision corresponding to the preferred viewing angle is completely unobstructed by the first layer of masks and the second layer of masks.

20. A method of manufacture comprising:
assembling a lens stack by:
disposing a first gradient-index liquid crystal lens comprising a first layer of masks; and
disposing a second gradient-index liquid crystal lens in tandem with the first gradient-index liquid crystal lens, the second gradient-index liquid crystal lens comprising a second layer of masks,
wherein the lens stack is configured to reach a target optical power based on a first optical power of the first gradient-index liquid crystal lens and a second optical power of the second gradient-index liquid crystal lens, and
wherein a difference of mask patterns between the first layer of masks and the second layer of masks is based on the first optical power of the first gradient-index liquid crystal lens and the second optical power of the second gradient-index liquid crystal lens.

\* \* \* \* \*